(12) United States Patent
Iwamoto

(10) Patent No.: US 12,315,888 B2
(45) Date of Patent: May 27, 2025

(54) BATTERY

(71) Applicant: Panasonic Intellectual Property Management Co., Ltd., Osaka (JP)

(72) Inventor: Kazuya Iwamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 510 days.

(21) Appl. No.: 17/661,715

(22) Filed: May 2, 2022

(65) Prior Publication Data
US 2022/0263138 A1 Aug. 18, 2022

Related U.S. Application Data

(63) Continuation of application No. PCT/JP2020/016398, filed on Apr. 14, 2020.

(30) Foreign Application Priority Data

Nov. 28, 2019 (JP) .................................. 2019-215404

(51) Int. Cl.
*H01M 10/0585* (2010.01)
*H01M 10/0562* (2010.01)
*H01M 50/55* (2021.01)
(52) U.S. Cl.
CPC ....... *H01M 10/0585* (2013.01); *H01M 50/55* (2021.01); *H01M 10/0562* (2013.01)
(58) Field of Classification Search
CPC ............. H01M 10/0585; H01M 50/55; H01M 10/0562
USPC ........................................................ 429/405
See application file for complete search history.

(56) References Cited

U.S. PATENT DOCUMENTS

2019/0334209 A1   10/2019   Nagase

FOREIGN PATENT DOCUMENTS

| CN | 110416620 A | 11/2019 |
| JP | 2004-228028 | 8/2004 |
| JP | 2010-080299 | 4/2010 |
| JP | 2013-020915 | 1/2013 |

(Continued)

OTHER PUBLICATIONS

International Search Report of PCT application No. PCT/JP2020/016398 dated Jun. 23, 2020.

(Continued)

*Primary Examiner* — Christian Roldan
(74) *Attorney, Agent, or Firm* — Rimon P.C.

(57) ABSTRACT

A battery including: a first electrode layer; a solid electrolyte layer disposed above the first electrode layer; a second electrode layer disposed above the solid electrolyte layer; and an electrode. The first electrode layer includes: a first current collector; and a first mixture layer disposed between the first current collector and the solid electrolyte layer. The first current collector includes a terminal portion protruding from the second electrode layer in top view, the solid electrolyte layer is exposed in at least a region of the terminal portion in the top view, the solid electrolyte layer covers part of a side surface of the first mixture layer in cross-sectional view and is in contact with the terminal portion of the first current collector, and the electrode is in contact with the solid electrolyte layer in an inside of at least a region of the terminal portion in top view.

8 Claims, 7 Drawing Sheets

(56) References Cited

FOREIGN PATENT DOCUMENTS

| JP | 2017-142889 | | 8/2017 | |
|---|---|---|---|---|
| JP | 2017142889 A | * | 8/2017 | |
| JP | 2019-192596 | | 10/2019 | |
| JP | 2019192596 A | * | 10/2019 | ......... G01N 27/4161 |
| JP | 7070052 B2 | * | 5/2022 | ............. B32B 15/16 |
| WO | 2018/141723 A1 | | 8/2018 | |

OTHER PUBLICATIONS

English Translation of Chinese Search Report dated Sep. 21, 2024 for the related Chinese Patent Application No. 202080070516.7.

* cited by examiner

BATTERY

BACKGROUND

1. Technical Field

The present disclosure relates to a battery including a solid electrolyte.

2. Description of the Related Art

Failure analysis of a battery including an electrolyte "solution" normally involves disassembling a battery, then separating a positive electrode and a negative electrode, and measuring the electrical characteristics (e.g., charge/discharge characteristics or impedance) of the positive electrode and the negative electrode, or inserting a reference electrode and measuring the behaviors of the positive electrode and the negative electrode using the reference electrode.

However, a battery (e.g., all-solid-state battery) including a solid electrolyte cannot be disassembled without breaking a positive electrode layer and a negative electrode layer since the battery is produced so as to integrate the positive electrode layer, a solid electrolyte layer, and the negative electrode layer.

In a battery including an electrolyte "solution", a reference electrode functions as long as being immersed in an electrolyte solution, and the reference electrode can thus be "substantially" freely placed at any position. However, in an all-solid-state battery, a reference electrode cannot be freely placed outside a power generation element including a positive electrode layer, a solid electrolyte layer, and a negative electrode layer.

Japanese Unexamined Patent Application Publication No. 2010-80299 (PTL 1) discloses a structure including a third electrode (reference electrode) inserted "in" a solid electrolyte layer in advance.

Japanese Unexamined Patent Application Publication No. 2013-20915 (PTL 2) discloses that a solid electrolyte is pressed against a periphery of a bulk-type all-solid-state battery and then a third electrode (reference electrode) is disposed at the periphery.

SUMMARY

One non-limiting and exemplary embodiment provides a battery in which a reference electrode can be easily placed.

In one general aspect, the techniques disclosed a battery including: a first electrode layer; a solid electrolyte layer disposed above the first electrode layer; a second electrode layer disposed above the solid electrolyte layer; and an electrode. The first electrode layer includes: a first current collector; and a first mixture layer disposed between the first current collector and the solid electrolyte layer. The first current collector includes a terminal portion protruding from the second electrode layer in top view, the solid electrolyte layer is exposed in at least a region of the terminal portion in the top view, the solid electrolyte layer covers part of a side surface of the first mixture layer in cross-sectional view and is in contact with the terminal portion of the first current collector, and the electrode is in contact with the solid electrolyte layer in an inside of at least a region of the terminal portion in top view.

The present disclosure can provide a battery in which a reference electrode can be easily placed.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
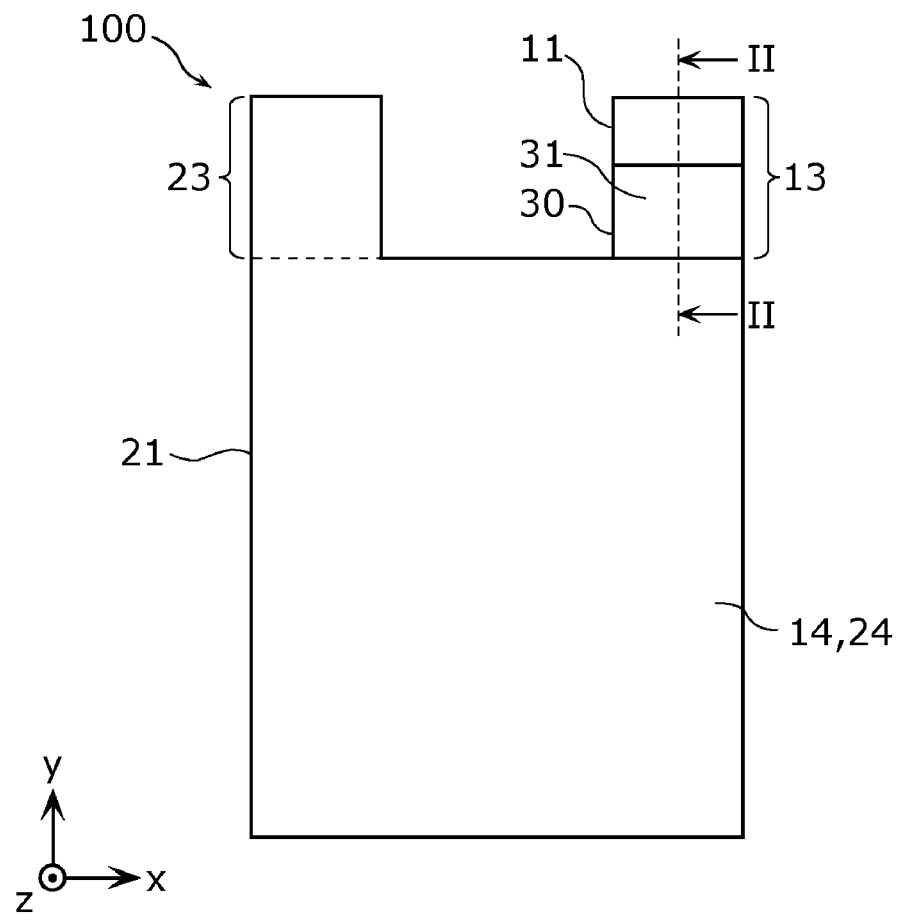
FIG. 1 is a top view of a schematic structure of a battery according to a first embodiment.

Underlying Knowledge Forming Basis of the Present Disclosure

The inventors of the present disclosure have found that the following problems occur when a reference electrode is placed in a battery including a solid electrolyte, particularly a thin multi-layered all-solid state battery.

In the structure disclosed in PTL 1, a reference electrode is inserted and buried in a solid electrolyte layer to obstruct conduction paths (channels) for lithium ions. The third electrode is inserted and buried in the solid electrolyte layer, and the thickness of the solid electrolyte layer cannot be reduced. In addition, the positive electrode or the negative electrode and the reference electrode are disposed with the thin solid electrolyte layer therebetween, and this configuration may cause short-circuiting between the positive electrode or the negative electrode and the reference electrode. Accordingly, the structure disclosed in PTL 1 has the above problems.

With regard to the structure disclosed in PTL 2, the solid electrolyte layer is thin and brittle and thus unlikely to support a reference electrode in, for example, a thin film all-solid state battery produced by using a vacuum process or a thin multi-layered all-solid state battery, such as an all-solid electrolyte layer, produced by applying and drying a slurry containing a binder. Thus, the solid electrolyte layer adjacent to the reference electrode tends to be damaged, and it is not easy to place the reference electrode. If the solid electrolyte layer is damaged, the reference electrode on the solid electrolyte layer may come into contact with another power generation element to cause short-circuiting, resulting in low battery safety. It is important to ensure the safety of the battery, and the reference electrode cannot be easily placed if the safety of the battery is reduced in such a case.

The present disclosure provides an all-solid-state battery, particularly a thin multi-layered all-solid state battery, in which a reference electrode can be easily placed.

Summary of Present Disclosure

An aspect of the present disclosure is summarized below.

A battery according to an aspect of the present disclosure includes: a first electrode layer; a solid electrolyte layer disposed above the first electrode layer; a second electrode layer disposed above the solid electrolyte layer; and an electrode. The first electrode layer includes: a first current collector; and a first mixture layer disposed between the first current collector and the solid electrolyte layer. The first current collector includes a terminal portion protruding from the second electrode layer in top view, the solid electrolyte layer is exposed in at least a region of the terminal portion in the top view, the solid electrolyte layer covers part of a side surface of the first mixture layer in cross-sectional view and is in contact with the terminal portion of the first current collector, and the electrode is in contact with the solid electrolyte layer in an inside of at least a region of the terminal portion in top view. For example, part of the side surface of the first mixture layer faces the terminal portion in the cross-sectional view.

The solid electrolyte layer accordingly includes a region protruding from the second electrode layer and exposed above the terminal portion in top view. Thus, a reference electrode can be disposed on the exposed region of the solid electrolyte layer. In other words, the reference electrode can be disposed in the battery without providing the battery with a new terminal structure dedicated to a reference electrode, whereby the battery can be provided with a function of the reference electrode. The exposed region of the solid electrolyte layer is supported by the terminal portion of the first current collector, and the solid electrolyte layer is thus unlikely to be damaged.

In addition, it is not necessary to insert the reference electrode between the first electrode layer and the second electrode layer, suppressing short-circuiting between the reference electrode and the first electrode layer or the second electrode layer. It is thus easy to place a reference electrode in the battery according to this aspect. In addition, the side surface of the first mixture layer adjacent to the terminal portion is covered with the solid electrolyte layer. When a reference electrode is disposed in a region of the solid electrolyte layer exposed above the terminal portion, such a configuration suppresses short-circuiting caused by contact between the reference electrode and the first mixture layer.

Since the electrode is disposed on the exposed region of the solid electrolyte layer of the battery, it is easy to place the electrode in the battery. When the electrode functions as a reference electrode, the battery is provided with a function of a reference electrode without having a new reference electrode.

For example, part of the first mixture layer may be disposed on the terminal portion, and the solid electrolyte layer may cover the entire upper surface of the first mixture layer.

The upper surface of the first mixture layer is not exposed accordingly. When a reference electrode is disposed on the solid electrolyte layer disposed above the first mixture layer, such a configuration suppresses short-circuiting caused by contact between the reference electrode and the first mixture layer.

For example, the second electrode layer may include a second current collector and a second mixture layer between the second current collector and the solid electrolyte layer, and the solid electrolyte layer may cover the entire lower surface of the second mixture layer, cover part of a side surface of the second mixture layer in the cross-sectional view, and be in contact with the second current collector. For example, part of the side surface of the second mixture layer faces the terminal portion in the cross-sectional view.

The lower surface and a side surface of the second mixture layer adjacent to the terminal portion are thus covered by the solid electrolyte layer. When a reference electrode is disposed in a region of the solid electrolyte layer exposed above the terminal portion, such a configuration suppresses short-circuiting caused by contact between the reference electrode and the second mixture layer.

For example, the second electrode may include a rectangular region having a rectangular shape in top view, and the terminal portion may protrude from part of a side of the rectangular region in top view.

This can reduce the width of the terminal portion which does not function as a power generation element of the battery. It is thus easy to place a reference electrode in the battery while suppressing a decrease in weight energy density of the battery.

For example, the solid electrolyte layer may contain a solid electrolyte having lithium-ion conductivity.

It is thus easy to place a reference electrode in a lithium-ion battery containing a solid electrolyte.

Embodiments will be described below with reference to the drawings.

Any embodiment described below illustrates comprehensive or specific examples. The values, shapes, materials, and components, and the arrangement positions and connection of the components, and the like described in the following embodiments are illustrative only and are not intended to limit the present disclosure.

In this specification, the terms expressing the relationship between elements, such as parallel, the terms expressing the shapes of elements, such as flat or rectangular, and the numerical ranges are not expressions having only strict meanings but expressions having meanings in a substantially equivalent range, for example, including a difference of about several percentages.

The drawings are not necessarily accurately illustrated. In the drawings, components having substantially the same function are denoted by the same reference characters, and the redundant description thereof is omitted or simplified.

In this specification and the drawings, the x-axis, y-axis, and z-axis represent three axes in a three-dimensional cartesian coordinate system. In each embodiment, the z-axis direction corresponds to the thickness direction of the battery. The positive direction of the z-axis is upward in the z-axis direction, and the negative direction of the z-axis is downward in the z-axis direction. The term "thickness direction" in this specification refers to the direction perpendicular to a plane on which layers are stacked.

The term "top view" in this specification refers to the view of the battery along the z-axis from above in the z-axis direction.

In this specification, the terms "above" and "below" regarding the structure of the battery do not refer to a higher level (vertically above) and a lower level (vertically below) in absolute space recognition but are used as terms defined by the relative positional relationship based on the stacking sequence in the multilayer structure. The terms "above" and "below" are used not only when two components are spaced apart from each other with another component therebetween, but also when two components are disposed in close contact with each other so that they touch each other.

First Embodiment

First, a battery according to a first embodiment will be described below.

Structure of Battery

Figure 2:
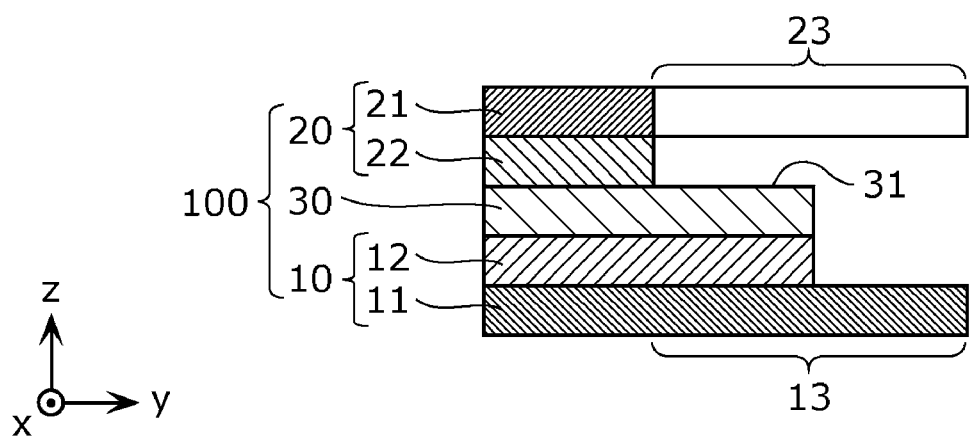
FIG. 2 is a cross-sectional view taken along line II-II in FIG. 1.

First, the structure of the battery according to this embodiment will be described. FIG. 1 is a top view of a schematic structure of a battery 100 according to this embodiment. FIG. 2 is a cross-sectional view taken along line II-II in FIG. 1. FIG. 2 illustrates the cross section of a region of the battery 100 that includes a terminal portion 13.

Referring to FIG. 1 and FIG. 2, the battery 100 includes a first electrode layer 10, a solid electrolyte layer 30 above the first electrode layer 10, and a second electrode layer 20 above the solid electrolyte layer 30.

The first electrode layer 10 includes a first current collector 11 and a first mixture layer 12 between the first current collector 11 and the solid electrolyte layer 30. The first electrode layer 10 includes a power generation region 14 overlapping the second electrode layer 20 and having a rectangular shape in top view. The second electrode layer 20 faces the first electrode layer 10. The second electrode layer 20 includes a second current collector 21 and a second mixture layer 22 between the second current collector 21 and the solid electrolyte layer 30. The second electrode layer 20 includes a power generation region 24 overlapping the first electrode layer 10 and having a rectangular shape in top view. In this specification, the power generation region 14 and the power generation region 24 are examples of the rectangular region.

The battery 100 is, for example, a thin multi-layered all-solid state battery. The first current collector 11 and the second current collector 21 each have, for example, a thickness greater than or equal to 5 μm and less than or equal to 100 μm. The first mixture layer 12 and the second mixture layer 22 each have, for example, a thickness greater than or equal to 5 μm and less than or equal to 300 μm. The solid electrolyte layer 30 includes, for example, a thickness greater than or equal to 5 μm and less than or equal to 150 m.

The first current collector 11 includes the terminal portion 13 protruding from the second electrode layer 20 in top view. Specifically, in top view, the first current collector 11 includes a rectangular region overlapping the power generation region 24 of the second electrode layer 20 and the terminal portion 13 protruding from the rectangular region. For example, the periphery of the second electrode layer 20 in top view coincides with the periphery of the second current collector 21, and the terminal portion 13 thus protrudes from the second current collector 21 in top view. The terminal portion 13 protrudes from part of a side of the power generation region 24 of the second electrode layer 20 in top view. Thus, the width of the terminal portion 13 in the x-axis direction (i.e., the direction perpendicular to the direction in which the terminal portion 13 protrudes from the second electrode layer 20) is smaller than the width of the power generation region 14 and the power generation region 24 in the x-axis direction. The width of the terminal portion 13 in the x-axis direction is, for example, smaller than or equal to half the width of the power generation region 14 and the power generation region 24 in the x-axis direction. The width of the terminal portion 13, which does not function as a power generation element, can thus be narrowed to improve the weight energy density of the battery 100. The possibility of the terminal portion 13 coming into contact with other terminal portions or the like can be reduced by narrowing the width of the terminal portion 13, suppressing short-circuiting.

The terminal portion 13 is rectangular in the illustrated example, but may have a shape other than rectangular. The terminal portion 13 is used as, for example, a terminal for drawing a current from the battery 100. The terminal portion 13 includes a region with neither the first mixture layer 12 nor the solid electrolyte layer 30 on the terminal portion 13 so that the upper and lower surfaces of the terminal portion 13 are exposed. With this configuration, a conductor or other means for drawing a current can be connected to the terminal portion 13 so as to sandwich the terminal portion 13 from the upper and lower surfaces.

The first mixture layer 12 is in contact with the first current collector 11 and disposed above the first current collector 11. In top view, a part of the first mixture layer 12 is disposed in the power generation region 14, and the other part of the first mixture layer 12 is disposed on the terminal portion 13 of the first current collector 11. The upper surface of the first mixture layer 12 on the terminal portion 13 is covered with the solid electrolyte layer 30 and not exposed. In top view, the first mixture layer 12 is disposed over the entire power generation region 14, but the present disclosure is not limited to this configuration. In top view, the first mixture layer 12 may have a smaller area than the power generation region 14 and may be disposed inside the power generation region 14. When the first mixture layer 12 is disposed inside the power generation region 14, the solid electrolyte layer 30 may be disposed in contact with the side surfaces of the first mixture layer 12 and the first current collector 11.

The second current collector 21 includes a terminal portion 23 protruding from the first electrode layer 10 in top view. Specifically, in top view, the second current collector 21 includes a rectangular region overlapping the power generation region 14 of the first electrode layer 10 and the terminal portion 23 protruding from the rectangular region. For example, the periphery of the first electrode layer 10 in top view coincides with the periphery of the first current collector 11, and the terminal portion 23 thus protrudes from the first current collector 11 in top view. The terminal portion 23 protrudes from part of a side of the power generation region 14 of the first electrode layer 10 in top view. Thus, the width of the terminal portion 23 in the x-axis direction (i.e., the direction perpendicular to the direction in which the terminal portion 23 protrudes from the first electrode layer 10) is smaller than the width of the power generation region 14 and the power generation region 24 in the x-axis direction. The width of the terminal portion 23 in the x-axis direction is, for example, smaller than or equal to half the width of the power generation region 14 and the power generation region 24 in the x-axis direction. The terminal portion 23 is rectangular in the illustrated example, but may have a shape other than rectangular. The direction in which the terminal portion 23 protrudes from the first electrode layer 10 is the same as the direction in which the terminal portion 13 protrudes from the second electrode layer 20. The terminal portion 23 is used as, for example, a terminal for drawing a current from the battery 100.

The second current collector 21 does not necessarily include the terminal portion 23. For example, the second current collector 21 may be joined to a lead layer made of conductive material to draw a current from the battery 100.

The second mixture layer 22 is in contact with the second current collector 21 and disposed below the second current collector 21. In top view, the second mixture layer 22 is disposed in the power generation region 24. In top view, the second mixture layer 22 is disposed over the entire power generation region 24, but the present disclosure is not limited to this configuration. In top view, the second mixture layer 22 may have a smaller area than the power generation region 24 and may be disposed inside the power generation region 24. When the second mixture layer 22 is disposed inside the power generation region 24, the solid electrolyte layer 30 may be disposed in contact with the side surfaces of the second mixture layer 22 and the second current collector 21.

The solid electrolyte layer 30 is disposed between the first electrode layer 10 and the second electrode layer 20. Specifically, the solid electrolyte layer 30 is disposed between the first mixture layer 12 and the second mixture layer 22 and in contact with the upper surface of the first mixture layer 12 and the lower surface of the second mixture layer 22. The solid electrolyte layer 30 covers the entire upper surface of the first mixture layer 12 and the entire lower surface of the second mixture layer 22. This configuration suppresses short-circuiting caused by the first mixture layer 12 and the second mixture layer 22 coming into contact with other electrodes or the like.

In top view, the solid electrolyte layer 30 includes a rectangular region overlapping the power generation region 14 and the power generation region 24 and an exposed region 31 protruding from the rectangular region. In top view, the exposed region 31 is disposed inside the terminal portion 13 and overlaps the terminal portion 13. In other words, the solid electrolyte layer 30 is exposed in a region of the terminal portion 13 in top view. The exposed region 31 of the solid electrolyte layer 30 is in contact with the upper surface of the first electrode layer 10, specifically, the upper surface of the first mixture layer 12. In top view, the side surfaces of the solid electrolyte layer 30 are located at the same positions as the side surfaces of the first mixture layer 12 on the terminal portion 13. The solid electrolyte layer 30 may cover at least one of the side surfaces of the first mixture layer 12 on the terminal portion 13 and be in contact with the first current collector 11.

The length of the exposed region 31 in the y-axis direction and the width of the exposed region 31 in the x-axis direction are large enough to place a reference electrode and are each, for example, greater than or equal to 5 mm.

Next, the materials of the components of the battery 100 will be described.

In this embodiment, one of the first electrode layer 10 including the first current collector 11 and the first mixture layer 12 and the second electrode layer 20 including the second current collector 21 and the second mixture layer 22 is a positive electrode layer including a positive electrode current collector and a positive electrode mixture layer, and the other is a negative electrode layer including a negative electrode current collector and a negative electrode mixture layer.

The positive electrode current collector and the negative electrode current collector may be made of known materials. The positive electrode current collector and the negative electrode current collector are formed of, for example, a foil, plate, or mesh made of, for example, copper, aluminum, nickel, iron, stainless steel, platinum, or gold, or an alloy of two or more of these metals.

The positive electrode mixture layer contains at least a positive electrode active material and may further contain at least one selected from the group consisting of solid electrolytes, conductive assistants, and binding agents (binders) as necessary.

The positive electrode active material may be a known material capable of accepting and releasing (intercalating and deintercalating or dissolving and depositing) lithium ions, sodium ions, or magnesium ions. When the positive electrode active material is a material capable of intercalating and deintercalating lithium ions, the positive electrode active material is, for example, lithium cobalt oxide composite oxide (LCO), lithium nickel oxide composite oxide (LNO), lithium manganese oxide composite oxide (LMO), lithium-manganese-nickel composite oxide (LMNO), lithium-manganese-cobalt composite oxide (LMCO), lithium-nickel-cobalt composite oxide (LNCO), or lithium-nickel-manganese-cobalt composite oxide (LNMCO).

The solid electrolyte may be a known material, such as a lithium ion conductor, a sodium ion conductor, or a magnesium ion conductor. The solid electrolyte may be either an inorganic solid electrolyte or a polymer solid electrolyte (including a gel solid electrolyte). The inorganic solid electrolyte is, for example, a sulfide solid electrolyte or an oxide solid electrolyte. When the sulfide solid electrolyte is a lithium ion-conducting material, the sulfide solid electrolyte is, for example, a synthetic product composed of lithium sulfide ($Li_2S$) and phosphorus pentasulfide ($P_2S_5$). The sulfide solid electrolyte may be a sulfide, such as $Li_2S$—$SiS_2$, $Li_2S$—$B_2S_3$, or $Li_2S$—$GeS_2$, or may be a sulfide formed by adding at least one of $Li_3N$, $LiCl$, $LiBr$, $Li_3PO_4$, or $Li_4SiO_4$ to the above sulfide as an additive.

When the oxide solid electrolyte is a lithium ion-conducting material, the oxide solid electrolyte is, for example, $Li_7La_3Zr_2O_{12}$(LLZ), $Li_{1.3}Al_{0.3}Ti_{1.7}(PO_4)_3$(LATP), or (La,Li)$TiO_3$(LLTO).

The conductive assistant is, for example, a conductive material, such as acetylene black, carbon black, graphite, or carbon fiber. The binding agent is, for example, a binder for binding, such as polyvinylidene fluoride.

The negative electrode mixture layer contains at least a negative electrode active material and may further contain at least one selected from the group consisting of solid electrolytes, conductive assistants, and binding agents as necessary, like the positive electrode mixture layer.

The negative electrode active material may be a known material capable of accepting and releasing (intercalating and deintercalating or dissolving and depositing) lithium ions, sodium ions, or magnesium ions. When the negative electrode active material is a material capable of intercalating and deintercalating lithium ions, the negative electrode active material is, for example, a carbon material, such as natural graphite, artificial graphite, graphite carbon fiber, or resin heat-treated carbon, metal lithium, a lithium alloy, or a lithium transition metal oxide.

The solid electrolyte layer 30 may contain at least a solid electrolyte and may further contain a binding agent as necessary. The solid electrolyte layer 30 may contain a solid electrolyte having lithium-ion conductivity.

The solid electrolyte and the binding agent may be the solid electrolyte and the binding agent described above.

As described above, the battery 100 includes the first electrode layer 10, the solid electrolyte layer 30 above the first electrode layer 10, and the second electrode layer 20 above the solid electrolyte layer 30. The first electrode layer 10 includes the first current collector 11 and the first mixture layer 12 between the first current collector 11 and the solid electrolyte layer 30. The first current collector 11 includes the protruding terminal portion 13 in top view. The solid electrolyte layer 30 is exposed in at least a region of the terminal portion 13 in top view.

According to the battery 100, the solid electrolyte layer 30 includes the exposed region 31 protruding from the second electrode layer 20 and exposed above the terminal portion 13 in top view. Thus, a reference electrode can be disposed on the exposed region 31 of the solid electrolyte layer 30. In other words, the reference electrode can be disposed in the battery 100, a unit cell, without providing the battery 100 with a new terminal structure dedicated to a reference electrode, whereby the battery 100 can be provided with a function of the reference electrode. For example, the number of components for forming a new terminal structure can be reduced. The exposed region 31 of the solid electrolyte layer 30 is supported by the terminal portion 13 of the first current collector 11, and the solid electrolyte layer 30 is thus unlikely to be damaged. In addition, it is not necessary to insert a reference electrode between the first electrode layer 10 and the second electrode layer 20, suppressing short-circuiting between the reference electrode and the first electrode layer 10 or the second electrode layer 20. It is thus easy to place a reference electrode in the battery 100. As a result, it may be easy to, for example, perform failure analysis using a reference electrode.

When a terminal to be connected to a reference electrode is extended to the outside of the outer body of the battery 100 in advance, the charge/discharge state of each of the positive electrode layer and the negative electrode layer of the battery 100 can be measured by using the reference electrode. As a result, the battery health or state of health of the battery 100 can be monitored and controlled to improve the reliability of the battery 100.

Method for Producing Battery

Next, a method for producing the battery 100 according to this embodiment will be described.

First, the first mixture layer 12 is formed on the first current collector 11 to produce the first electrode layer 10. Examples of the method for producing the first electrode layer 10 include known coating methods.

For example, a slurry is prepared by mixing one of a positive electrode active material and a negative electrode active material, an inorganic solid electrolyte, a binding agent, and an optional conductive assistant in an organic solvent. Subsequently, the slurry is applied onto the first current collector 11 and dried to form the first mixture layer 12 on the first current collector 11. The inorganic solid electrolyte may be replaced by a polymer solid electrolyte material.

Another method for forming the first mixture layer 12 on the first current collector 11 involves a known vacuum thin film deposition process, such as sputtering or vapor deposition, using the material of a positive electrode active material or negative electrode active material as a target (target source).

Another method for forming the first mixture layer 12 involves depositing a mixture of a positive or negative electrode active material, an inorganic solid electrolyte, and an optional conductive assistant on the first current collector 11 by an aerosol deposition method (AD method) or an electrostatic screen printing method.

To expose a region of the first current collector 11, which will be the terminal portion 13 in a subsequent process, in forming the first mixture layer 12 on the first current collector 11, the first electrode layer 10 is formed, for example, so as to expose part of the first current collector 11 such that the first mixture layer 12 has a smaller area than the first current collector 11 in top view.

The produced first electrode layer 10 can be optionally pressed by using, for example, a plate press machine, a roll press machine, or a cold isostatic press (CIP) machine.

Next, the solid electrolyte layer 30 is formed on the produced first electrode layer 10.

The solid electrolyte layer 30 is produced by using, for example, the same method as for producing the first electrode layer 10, that is, a coating method, a vacuum thin film deposition process, an AD method, or an electrostatic screen printing method. The solid electrolyte layer 30 is made of a solid electrolyte or a mixture of a solid electrolyte and a binding agent. The solid electrolyte layer 30 is formed in conformance with the shape of the upper surface of the first mixture layer 12 in top view.

Figure 3:
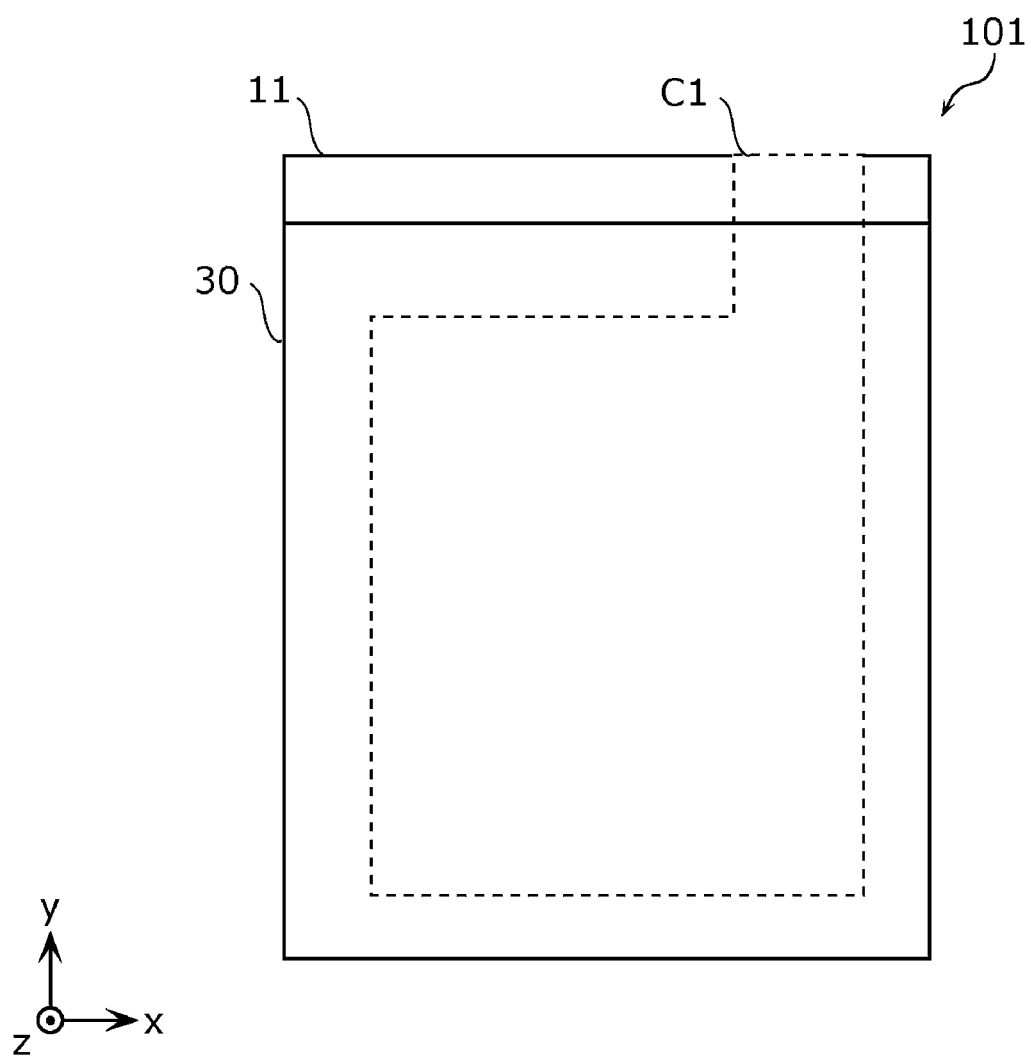
FIG. 3 is a top view for describing the process for forming a terminal portion in a first current collector in the method for producing the battery according to the first embodiment.
Figure 4:
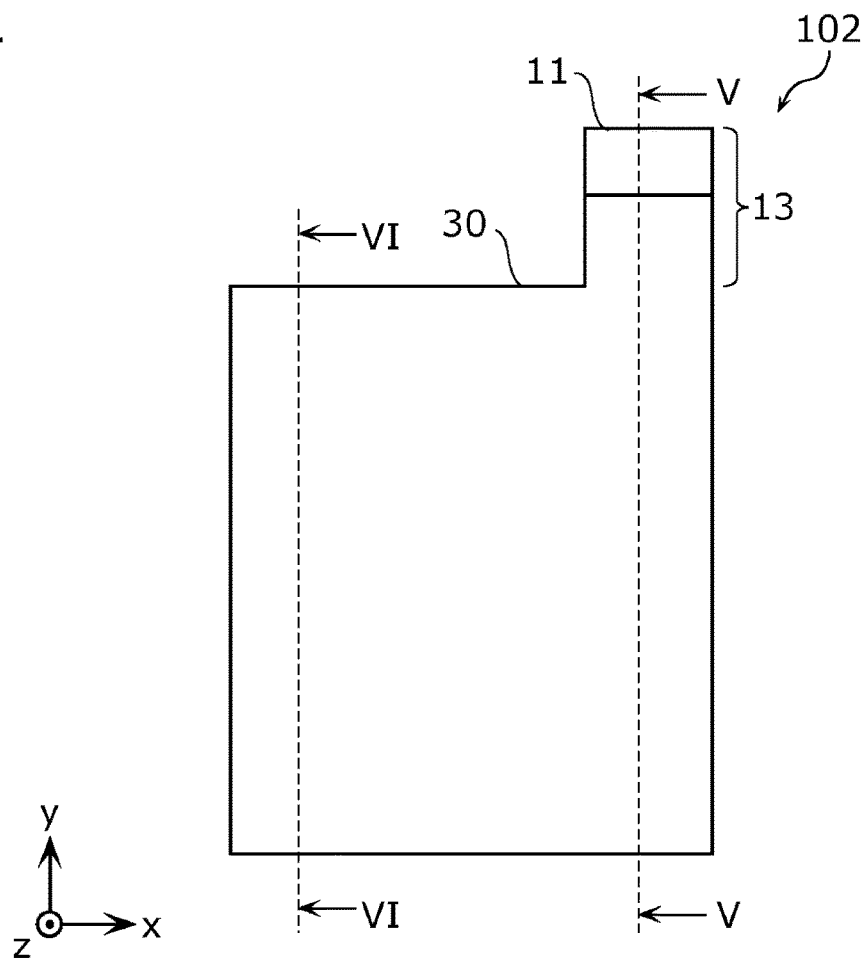
FIG. 4 is a top view for describing the terminal portion formed in the first current collector in the method for producing the battery according to the first embodiment.
Figure 5:
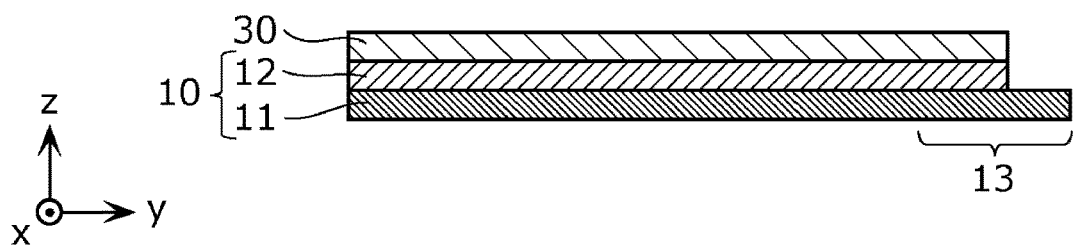
FIG. 5 is a cross-sectional view taken along line V-V in FIG. 4.
Figure 6:
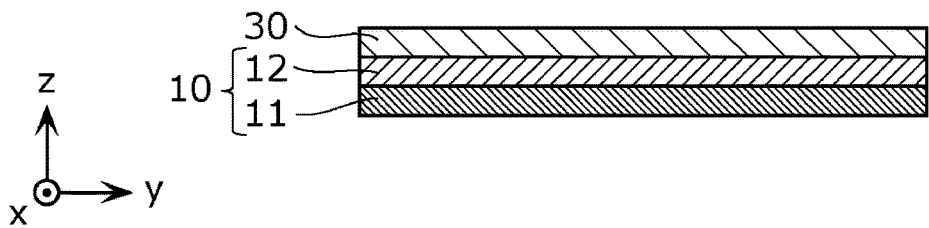
FIG. 6 is a cross-sectional view taken along line VI-VI in FIG. 4.

Next, the terminal portion 13 is formed in the first current collector 11. FIG. 3 is a top view for describing the process for forming the terminal portion 13 in the first current collector 11 in the method for producing the battery 100. FIG. 4 is a top view for describing the terminal portion 13 formed in the first current collector 11 in the method for producing the battery 100. FIG. 5 is a cross-sectional view taken along line V-V in FIG. 4. FIG. 6 is a cross-sectional view taken along line VI-VI in FIG. 4.

The above process forms a multilayer body 101 including the solid electrolyte layer 30 on the first mixture layer 12 of the first electrode layer 10 as illustrated in FIG. 3. In the multilayer body 101, in top view, the first current collector 11 includes a region with neither the first mixture layer 12 nor the solid electrolyte layer 30 on the first current collector 11.

The terminal portion 13 is formed by cutting or punching so as to include the region with neither the first mixture layer 12 nor the solid electrolyte layer 30 on the first current collector 11. Specifically, the multilayer body 101 is cut or punched at a position of cutting line C1 indicated by a dotted line to form a multilayer body 102 illustrated in FIG. 4. This process produces the first current collector 11 having the terminal portion 13.

As illustrated in FIG. 4 to FIG. 6, the multilayer body 102 includes the solid electrolyte layer 30 on the first electrode layer 10 having the first current collector 11 and the first mixture layer 12. The side surfaces of the first mixture layer 12 and the side surfaces of the solid electrolyte layer 30 are located at the same positions in top view, and part of the first mixture layer 12 and part of the solid electrolyte layer 30 are formed on the terminal portion 13 of the first current collector 11. In a region other than the terminal portion 13, the side surfaces of the first current collector 11, the side surfaces of the first mixture layer 12, and the side surfaces of the solid electrolyte layer 30 are located at the same positions in top view.

Figure 7:
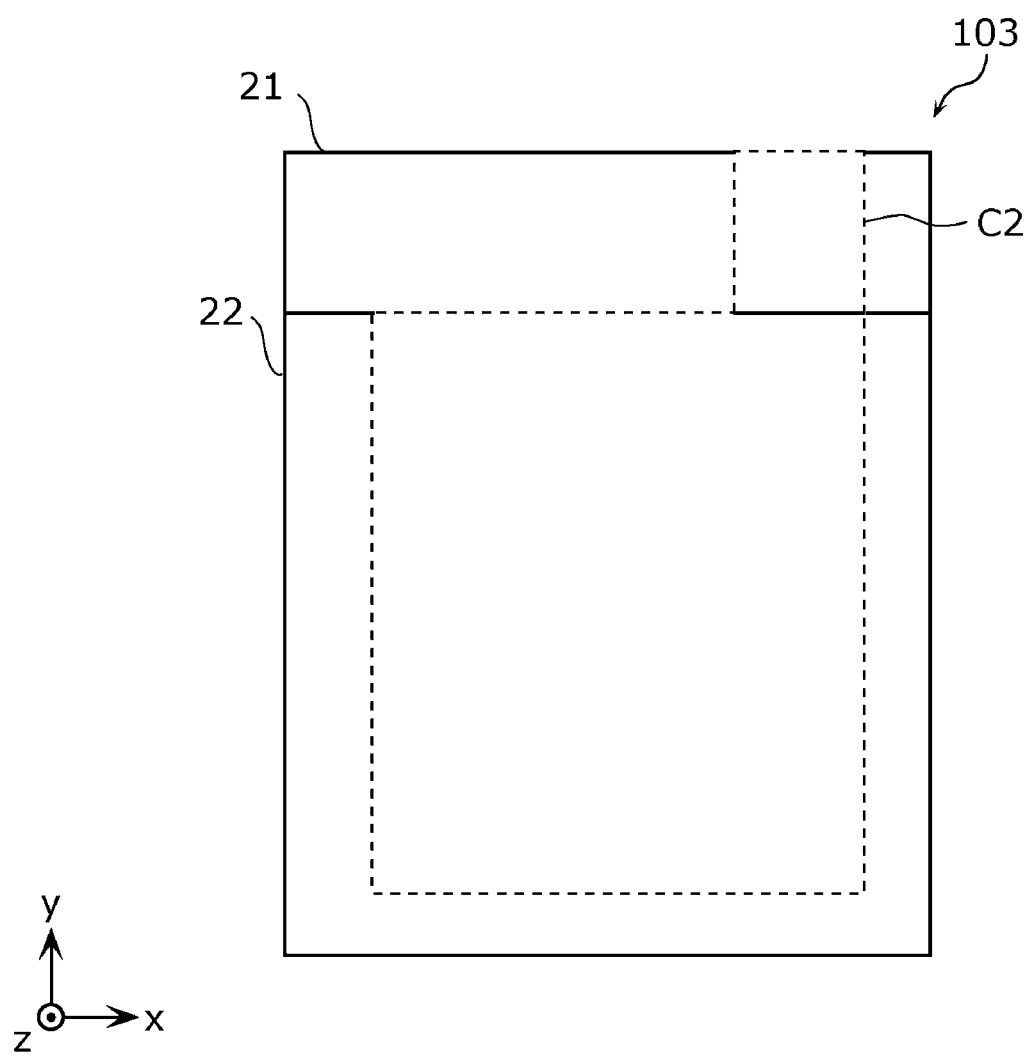
FIG. 7 is a top view for describing the process for forming the second electrode layer in the method for producing the battery according to the first embodiment.

Next, the second electrode layer 20 is formed. The second electrode layer 20 may be formed by the same method as for the first electrode layer 10. The second electrode layer 20 is formed by using one of the positive and negative electrode active materials that is not used for forming the first electrode layer 10. FIG. 7 is a top view for describing the process for forming the second electrode layer 20 in the method for producing the battery 100. First, as illustrated in FIG. 7, the second mixture layer 22 is formed on the second current collector 21 to produce a multilayer body 103. To expose a region of the second current collector 21, which will be the terminal portion 23 in a subsequent process, in forming the second mixture layer 22 on the second current collector 21, the multilayer body 103 is formed, for example, so as to expose part of the second current collector 21 such that the second mixture layer 22 has a smaller area than the second current collector 21 in top view.

Next, the produced multilayer body 103 is cut or punched at a position of cutting line C2 indicated by a dotted line to form the second electrode layer 20 having the same shape as the battery 100 illustrated in FIG. 1. In top view, the shape of the second electrode layer 20 formed by the production method according to this embodiment is, for example, the same as that of the first electrode layer 10. In other words, the shape formed by cutting line C2 is the same as the shape formed by cutting line C1 illustrated in FIG. 3. The first electrode layer 10 and the second electrode layer 20 can be thus processed into a certain shape by cutting or punching using the same process or a die or the like.

Next, the produced second electrode layer 20 is stacked upside down on the multilayer body 102 such that the solid electrolyte layer 30 comes into contact with the second mixture layer 22, and the second electrode layer 20 is joined to (pressed against) the multilayer body 102 to produce the battery 100. At this time, the multilayer body 102 and the second electrode layer 20 are stacked on top of each other such that the first electrode layer 10 and the second electrode layer 20 face as illustrated in FIG. 1.

Alternatively, the solid electrolyte layer 30 may also be formed on the second mixture layer 22 of the second electrode layer 20, and the solid electrolyte layer 30 on the second electrode layer 20 and the solid electrolyte layer 30 on the first electrode layer 10 may be stacked so as to come into contact with each other and joined to produce the battery 100.

Alternatively, the second electrode layer 20 may be produced by forming the second mixture layer 22 on the multilayer body 102 and further stacking the second current collector 21 on the second mixture layer 22.

In the battery 100, the solid electrolyte layer 30 is exposed in at least a region of the terminal portion 13 in top view, but the present disclosure is not limited to this configuration. For example, the solid electrolyte layer 30 may be exposed in at least a region of the terminal portion 23 in top view. In other words, the solid electrolyte layer 30 may be formed on at least one of the terminal portion 13 or the terminal portion 23.

Modification 1

Modification 1 of the first embodiment will be described below. In the description of Modification 1 below, the points different from the first embodiment will be mainly described, and description of common points will be omitted or simplified.

Figure 8:
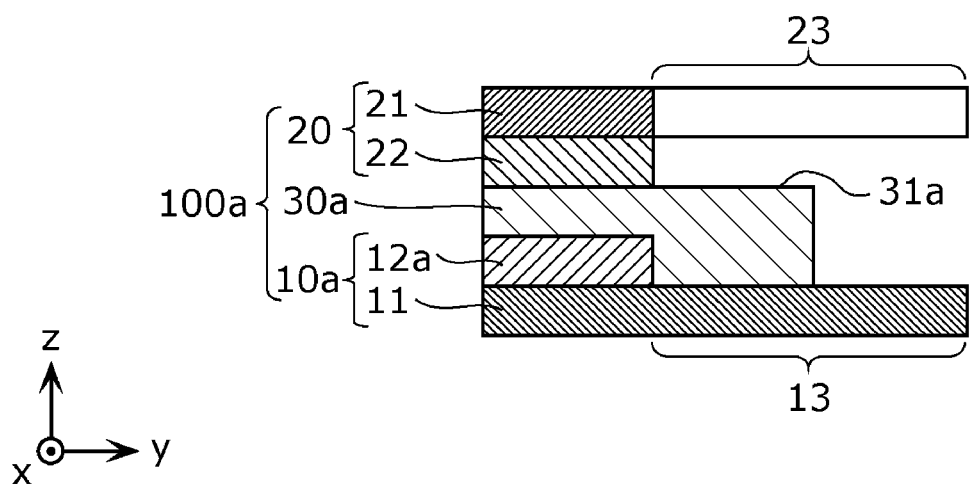
FIG. 8 is a cross-sectional view of a schematic structure of a battery according to Modification 1 of the first embodiment.

FIG. 8 is a cross-sectional view of a schematic structure of a battery 100a according to Modification 1. Like FIG. 2, FIG. 8 illustrates the cross section of a region of the battery 100a that includes a terminal portion 13. The battery 100a is different from the battery 100 according to the first embodiment in that the battery 100a includes a first electrode layer 10a and a solid electrolyte layer 30a instead of the first electrode layer 10 and the solid electrolyte layer 30.

Referring to FIG. 8, the battery 100a includes the first electrode layer 10a, the solid electrolyte layer 30a above the first electrode layer 10a, and a second electrode layer 20 above the solid electrolyte layer 30a.

The first electrode layer 10a includes a first current collector 11 and a first mixture layer 12a between the first current collector 11 and the solid electrolyte layer 30a.

The first mixture layer 12a is in contact with the first current collector 11 and disposed above the first current collector 11. The first mixture layer 12a is not disposed on the terminal portion 13 of the first current collector 11. Part of the first mixture layer 12a may be disposed on the terminal portion 13.

The solid electrolyte layer 30a is disposed between the first electrode layer 10a and a second electrode layer 20. The solid electrolyte layer 30a includes an exposed region 31a exposed in a region of the terminal portion 13 and protruding from the second electrode layer 20 in top view. The solid electrolyte layer 30a covers the entire upper surface of the first mixture layer 12a and the entire lower surface of the second mixture layer 22. The solid electrolyte layer 30a covers a side surface of the first mixture layer 12a adjacent to the terminal portion 13 in cross-sectional view and is in contact with the terminal portion 13 of the first current collector 11. When a reference electrode is placed on the solid electrolyte layer 30a exposed in a region of the terminal portion 13, such a configuration suppresses short-circuiting caused by contact between the reference electrode and the first mixture layer 12a.

The battery 100a is produced by, for example, forming the solid electrolyte layer 30a so as to cover the upper surface and a side surface of the first mixture layer 12a adjacent to the terminal portion 13 when the solid electrolyte layer 30a is formed on the first electrode layer 10a in the above production method.

Modification 2

Modification 2 of the first embodiment will be described below. In the description of Modification 2 below, the points different from the first embodiment will be mainly described, and description of common points will be omitted or simplified.

Figure 9:
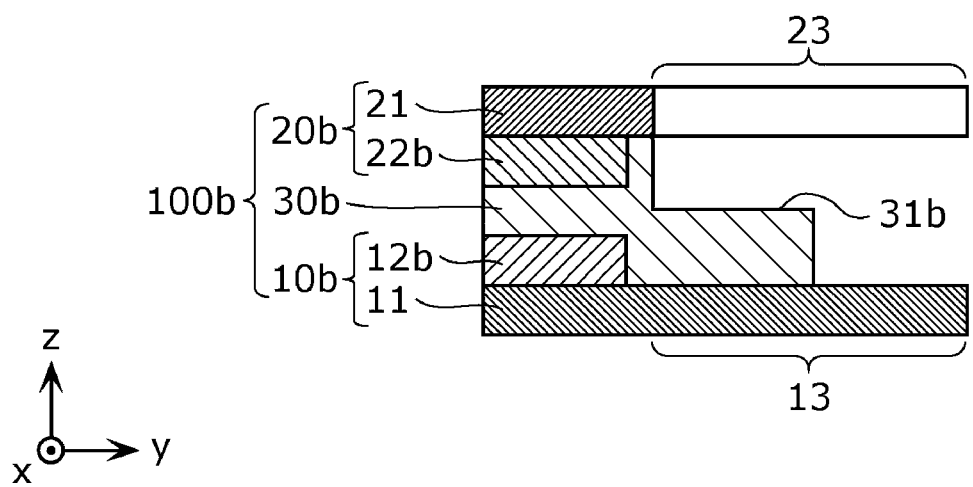
FIG. 9 is a cross-sectional view of a schematic structure of a battery according to Modification 2 of the first embodiment.

FIG. 9 is a cross-sectional view of a schematic structure of a battery 100b according to Modification 2. Like FIG. 2, FIG. 9 illustrates the cross section of a region of the battery 100b that includes a terminal portion 13. The battery 100b is different from the battery 100 according to the first embodiment in that the battery 100b includes a first electrode layer 10b, a second electrode layer 20b, and a solid electrolyte layer 30b instead of the first electrode layer 10, the second electrode layer 20, and the solid electrolyte layer 30.

Referring to FIG. 9, the battery 100b includes the first electrode layer 10b, the solid electrolyte layer 30b above the first electrode layer 10b, and the second electrode layer 20b above the solid electrolyte layer 30b.

The first electrode layer 10b includes a first current collector 11 and a first mixture layer 12b between the first current collector 11 and the solid electrolyte layer 30b. The second electrode layer 20b includes a second current collector 21 and a second mixture layer 22b between the second current collector 21 and the solid electrolyte layer 30b.

The first mixture layer 12b is in contact with the first current collector 11 and disposed above the first current collector 11. The first mixture layer 12b is not disposed on the terminal portion 13 of the first current collector 11. Part of the first mixture layer 12b may be disposed on the terminal portion 13.

The second mixture layer 22b is in contact with the second current collector 21 and disposed below the second current collector 21.

The solid electrolyte layer 30b is disposed between the first electrode layer 10b and the second electrode layer 20b. The solid electrolyte layer 30b has an exposed region 31b exposed in a region of the terminal portion 13 and protruding from the second electrode layer 20b in top view. The solid electrolyte layer 30b covers the entire upper surface of the first mixture layer 12b and the entire lower surface of the second mixture layer 22b. The solid electrolyte layer 30b covers a side surface of the first mixture layer 12b adjacent to the terminal portion 13 in cross-sectional view and is in contact with the terminal portion 13 of the first current collector 11. The solid electrolyte layer 30b covers a side surface of the second mixture layer 22b adjacent to the terminal portion 13 in cross-sectional view and is in contact with the second current collector 21. When a reference electrode is placed on the solid electrolyte layer 30b exposed in a region of the terminal portion 13, such a configuration suppresses short-circuiting caused by contact of the reference electrode with the first mixture layer 12b and the second mixture layer 22b.

The battery 100b is produced by, for example, the following method. In the above production method, the solid electrolyte layer 30b is formed on the first electrode layer 10b so as to cover the upper surface and a side surface of the first mixture layer 12b adjacent to the terminal portion 13. The second mixture layer 22b is further formed on the second current collector 21, and the solid electrolyte layer 30b is then further formed on the second mixture layer 22b. At this time, the solid electrolyte layer 30b is formed so as to cover the upper surface and a side surface of the second mixture layer 22b adjacent to the terminal portion 13. The first electrode layer 10b having the solid electrolyte layer 30b stacked thereon and the second electrode layer 20b having the solid electrolyte layer 30b stacked thereon which are obtained in this way are stacked on top of each other such that the solid electrolyte layers 30b come into contact with each other to produce the battery 100b.

Modification 3

Modification 3 of the first embodiment will be described below. In the description of Modification 3 below, the points different from the first embodiment will be mainly described, and description of common points will be omitted or simplified.

Figure 10:
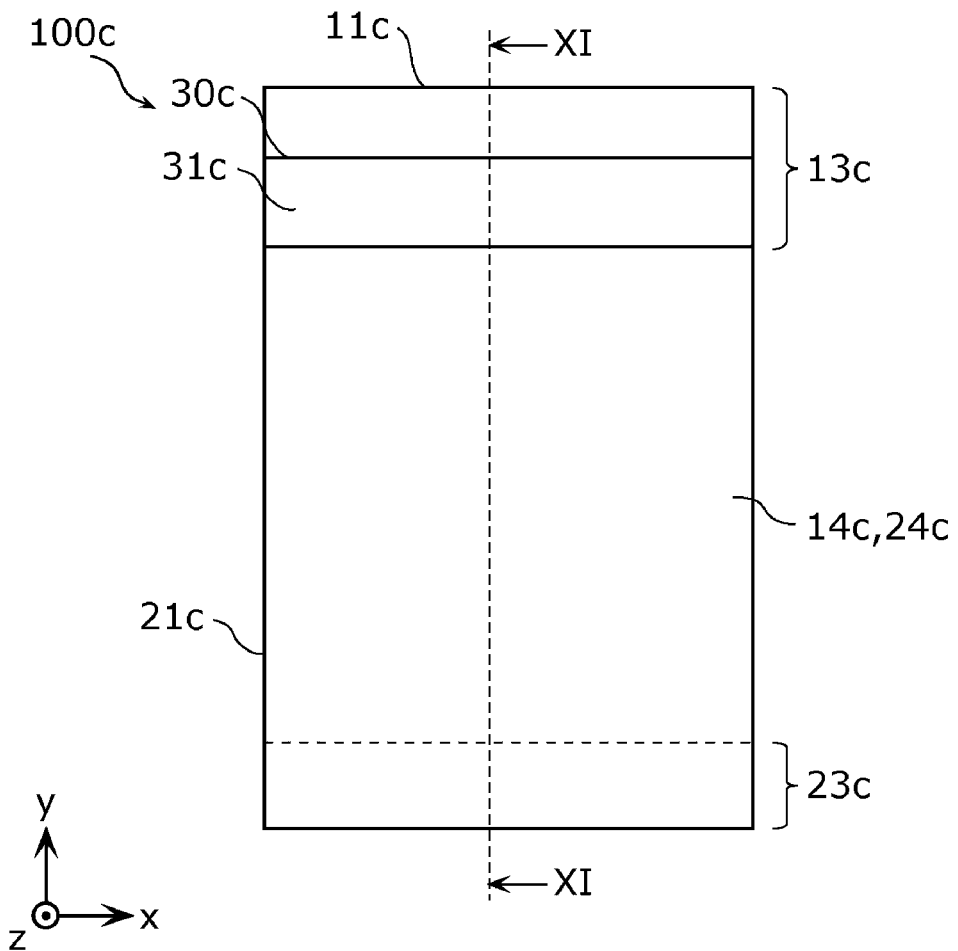
FIG. 10 is a top view of a schematic structure of a battery according to Modification 3 of the first embodiment.
Figure 11:
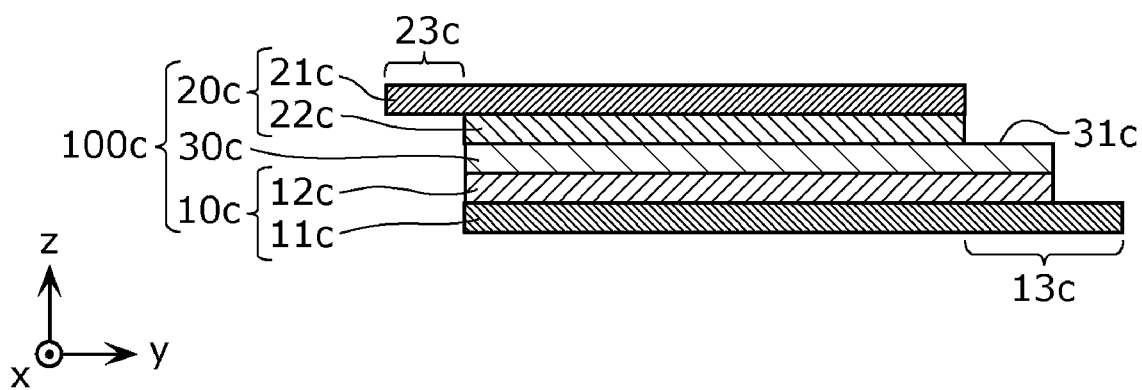
FIG. 11 is a cross-sectional view taken along line XI-XI in FIG. 10.

FIG. 10 is a top view of a schematic structure of a battery 100c according to Modification 3. FIG. 11 is a cross-sectional view taken along line XI-XI in FIG. 10. The battery 100c is different from the battery 100 according to the first embodiment in that the battery 100c includes a first electrode layer 10c, a second electrode layer 20c, and a solid electrolyte layer 30c instead of the first electrode layer 10, the second electrode layer 20, and the solid electrolyte layer 30.

Referring to FIG. 10 and FIG. 11, the battery 100c includes the first electrode layer 10c, the solid electrolyte layer 30c above the first electrode layer 10c, and the second electrode layer 20c above the solid electrolyte layer 30c. The first electrode layer 10c and the second electrode layer 20c are each rectangular in top view.

The first electrode layer 10c includes a first current collector 11c and a first mixture layer 12c between the first current collector 11c and the solid electrolyte layer 30c. The first electrode layer 10c includes a power generation region 14c overlapping the second electrode layer 20c and having a rectangular shape in top view. The second electrode layer 20c includes a second current collector 21c and a second mixture layer 22c between the second current collector 21c and the solid electrolyte layer 30c. The second electrode layer 20c includes a power generation region 24c overlapping the first electrode layer 10c and having a rectangular shape in top view. In the battery 100c, the first current collector 11c and the second current collector 21c are stacked so as to be offset from each other in the y-axis direction. A terminal portion 13c and a terminal portion 23c described below are formed accordingly. The first current collector 11c and the second current collector 21c have the same width in the x-axis direction (i.e., the direction perpendicular to the direction in which the terminal portion 13c protrudes from the second electrode layer 20c) in top view.

The first current collector 11c includes the terminal portion 13c protruding from the second electrode layer 20c in top view. Specifically, in top view, the first current collector 11c includes a rectangular region overlapping the power generation region 24c of the second electrode layer 20c and the terminal portion 13c protruding from the rectangular region. The first current collector 11c is rectangular in top view. In top view, the terminal portion 13c is a region of the first current collector 11c that does not overlap the second electrode layer 20c, wherein the first current collector 11c is stacked so as to be offset from the second electrode layer 20c in the y-axis direction. The width of the terminal portion 13c in the x-axis direction is the same as the width of the power generation region 24c (i.e., the second electrode layer 20c) in the x-axis direction.

The first mixture layer 12c is in contact with the first current collector 11c and disposed above the first current collector 11c. In top view, a part of the first mixture layer 12c is disposed in the power generation region 14c. The other part of the first mixture layer 12c is disposed on the terminal portion 13c of the first current collector 11c. The upper surface of the first mixture layer 12c on the terminal portion 13c is covered with the solid electrolyte layer 30c and not exposed.

The second current collector 21c includes the terminal portion 23c protruding from the first electrode layer 10c in top view. Specifically, in top view, the second current collector 21c includes a rectangular region overlapping the power generation region 14c of the first electrode layer 10c and the terminal portion 23c protruding from the rectangular region. The second current collector 21c is rectangular in top view. In top view, the terminal portion 23c is a region of the second current collector 21c that does not overlap the first electrode layer 10c, wherein the second current collector 21c is stacked so as to be offset from the first electrode layer 10c in the y-axis direction. The direction in which the terminal portion 23c protrudes from the first electrode layer 10c is opposite to the direction in which the terminal portion 13c protrudes from the second electrode layer 20c. The width of the terminal portion 23c in the x-axis direction is the same as the width of the power generation region 14c (i.e., the first electrode layer 10c) in the x-axis direction.

The second mixture layer 22c is in contact with the second current collector 21c and disposed below the second current collector 21c. In top view, the second mixture layer 22c is disposed in the power generation region 24c.

The solid electrolyte layer 30c is disposed between the first electrode layer 10c and the second electrode layer 20c. Specifically, the solid electrolyte layer 30c is disposed between the first mixture layer 12c and the second mixture layer 22c and in contact with the upper surface of the first mixture layer 12c and the lower surface of the second mixture layer 22c. The solid electrolyte layer 30c covers the entire upper surface of the first mixture layer 12c and the entire lower surface of the second mixture layer 22c.

In top view, the solid electrolyte layer 30c includes a rectangular region overlapping the power generation region 14c and the power generation region 24c and an exposed region 31c protruding from the rectangular region. In top view, the exposed region 31c is disposed in a region overlapping the terminal portion 13c. In other words, the solid electrolyte layer 30c is exposed in a region of the terminal portion 13c in top view.

The battery 100c is produced by, for example, stacking and joining the multilayer body 101 illustrated in FIG. 3 and the multilayer body 103 illustrated in FIG. 7 such that the solid electrolyte layer 30 comes into contact with the second mixture layer 22 and the battery 100c satisfies the positional relationship illustrated in FIG. 10. The first current collector 11c and the second current collector 21c are accordingly stacked so as to be offset from each other in the y-axis direction to form the terminal portion 13c, the terminal portion 23c, and the exposed region 31c. There is no need to perform cutting or punching in order to form the terminal portion 13c and the terminal portion 23c in the battery 100c. It is therefore easy to form the battery 100c.

Second Embodiment

Next, a battery according to a second embodiment will be described below. In the description of the second embodiment below, the points different from the first embodiment will be mainly described, and description of common points will be omitted or simplified.

Figure 12:
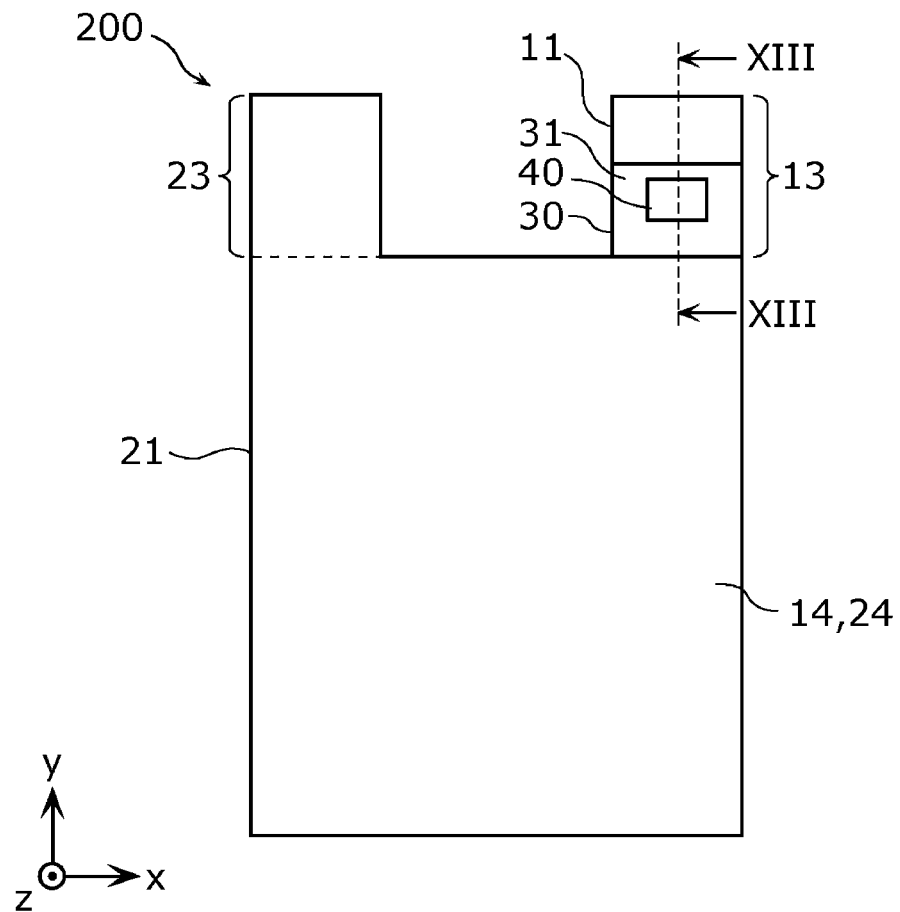
FIG. 12 is a top view of a schematic structure of a battery according to a second embodiment.
Figure 13:
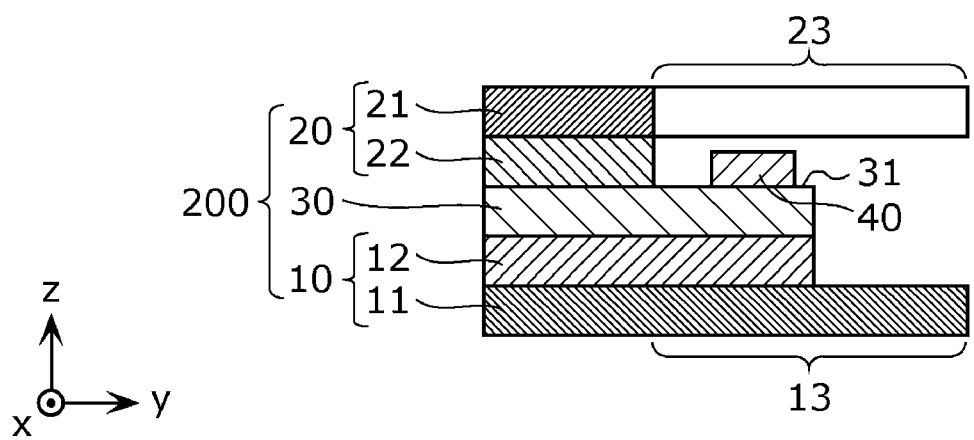
FIG. 13 is a cross-sectional view taken along line XIII-XIII in FIG. 12.

FIG. 12 is a top view of a schematic structure of a battery 200 according to this embodiment. FIG. 13 is a cross-sectional view taken along line XIII-XIII in FIG. 12. FIG. 13 illustrates the cross section of a region of the battery 200 that includes a terminal portion 13. The battery 200 is different from the battery 100 according to the first embodiment in that the battery 200 further includes an electrode 40.

Referring to FIG. 12 and FIG. 13, the battery 200 includes a first electrode layer 10, a second electrode layer 20, a solid electrolyte layer 30, and an electrode 40.

The electrode 40 is in contact with the solid electrolyte layer 30 in an exposed region 31. In top view, the electrode 40 is disposed inside the exposed region 31 and spaced apart from the second electrode layer 20. In the illustrated example, the electrode 40 is thinner than the second mixture layer 22. The present disclosure is not limited to this configuration, and the electrode 40 may be thicker than the second mixture layer 22.

To prevent contact between the electrode 40 and the second mixture layer 22, a solid electrolyte layer or an insulating layer made of insulating resin material may be formed between the electrode 40 and the second mixture layer 22. This configuration suppresses short-circuiting between the electrode 40 and the second mixture layer 22. The resin material may be a known material used as a battery sealing member.

The electrode 40 is, for example, a reference electrode used as a reference for measuring the potential between the positive electrode layer and the negative electrode layer. The reference electrode may be used to, for example, analyze failure of the battery 200 or monitor the operation conditions and control charging and discharging. The battery 200 is accordingly provided with a function of a reference electrode. The electrode 40 may include a current collector as necessary. The electrode 40 is connected to a terminal or the like. The reference electrode may be made of a material that shows a constant potential in a solid electrolyte. When the solid electrolyte is a lithium ion conductor, the material of the reference electrode is, for example, metal lithium, silver, indium-lithium alloy, or lithium titanium oxide ($Li_4Ti_5O_{12}$).

For example, the material of the reference electrode is, for example, metal sodium, silver, or potassium-sodium alloy when the solid electrolyte is a lithium ion conductor, or is, for example, metal magnesium or silver when the solid electrolyte is a magnesium ion conductor.

The battery 200 is produced by, for example, forming the electrode 40 on the solid electrolyte layer 30 of the formed multilayer body 102 in the above production method. The electrode 40 is formed by, for example, a pressure welding method, a coating method, or a vacuum thin film deposition process. The electrode 40 may be formed by a pressure welding method or a coating method among these methods because of the simplicity of the process.

Other Embodiments

The batteries according to the present disclosure are described above on the basis of the embodiments, but the present disclosure is not limited to these embodiments. Various modifications of the embodiments that would be conceived by those skilled in the art, and other forms constructed by combining some of components in the embodiments are also included in the present disclosure without departing from the gist of the present disclosure.

For example, the solid electrolyte layer 30 is exposed in a region of the terminal portion 13 in the above embodiments, but the present disclosure is not limited to this configuration. The solid electrolyte layer 30 may cover the entire upper surface of the terminal portion 13.

For example, the power generation region 14 and the power generation region 24 are rectangular in top view in the above embodiments, but the present disclosure is not limited to this configuration. The power generation region 14 and the power generation region 24 may have other shapes, such as circular, elliptic, semicircular, or polygons other than rectangular in top view.

For example, the direction in which the terminal portion 23 protrudes from the first electrode layer 10 is the same as the direction in which the terminal portion 13 protrudes from the second electrode layer 20 in the first embodiment and Modifications, but the present disclosure is not limited to this configuration. The direction in which the terminal portion 23 protrudes from the first electrode layer 10 may be different from the direction in which the terminal portion 13 protrudes from the second electrode layer 20, and may be, for example, perpendicular or opposite to the direction in which the terminal portion 13 protrudes from the second electrode layer 20.

A plurality of the batteries according to the above embodiments may be stacked to form a battery stack. When the batteries are stacked, all the batteries are not necessarily the batteries according to the above embodiments. For example, the battery stack may include a battery having a current collector without a terminal portion.

Various modifications, substitutions, additions, omissions, and the like can be made to the embodiments described above within the scope of the claims or the range of their equivalency.

The battery according to the present disclosure may be used as, for example, a battery in which a reference electrode is easily disposed. The battery according to the present disclosure is useful as, for example, an all-solid state battery, particularly as a thin multi-layered all-solid state battery.

What is claimed is:

1. A battery comprising:
a first electrode layer;
a solid electrolyte layer disposed above the first electrode layer;
a second electrode layer disposed above the solid electrolyte layer; and
an electrode, wherein:
the first electrode layer includes:
 a first current collector; and
 a first mixture layer disposed between the first current collector and the solid electrolyte layer,
the first electrode layer, the solid electrolyte layer and the second electrode layer are stacked along a stacked direction,
the electrode has a first surface facing the solid electrolyte layer and a second surface facing the first current collector,
the first current collector includes a terminal portion protruding from the second electrode layer in a top view viewed from the stacked direction,
the solid electrolyte layer is exposed in a region of the terminal portion in the top view,
the solid electrolyte layer covers a part of a side surface of the first mixture layer in cross-sectional view and is in contact with the terminal portion of the first current collector, and
the electrode is provided on the first surface of solid electrolyte layer in an inside of the region of the terminal portion in top view.

2. The battery according to claim 1, wherein
a part of the first mixture layer is disposed on the terminal portion, and
the solid electrolyte layer covers an entire upper surface of the first mixture layer.

3. The battery according to claim 1, wherein
the second electrode layer includes:
a second current collector; and
a second mixture layer between the second current collector and the solid electrolyte layer, and
the solid electrolyte layer covers an entire lower surface of the second mixture layer, covers a part of a side surface of the second mixture layer in the cross-sectional view, and is in contact with the second current collector.

4. The battery according to claim 1, wherein
the second electrode layer includes a rectangular region having a rectangular shape in the top view, and
the terminal portion protrudes from a part of a side of the rectangular region in the top view.

5. The battery according to claim 1, wherein the solid electrolyte layer contains a solid electrolyte having lithium-ion conductivity.

6. The battery according to claim 4, wherein:
a width of the terminal portion in a second direction perpendicular to the first direction is smaller than or equal to a half a width of the first current collector in the second direction.

7. A battery comprising:
a first electrode layer;
a solid electrolyte layer disposed above the first electrode layer;
a second electrode layer disposed above the solid electrolyte layer; and
an electrode, wherein:
the first electrode layer includes:
 a first current collector; and
 a first mixture layer disposed between the first current collector and the solid electrolyte layer,
the first electrode layer, the solid electrolyte layer and the second electrode layer are stacked along a stacked direction,
the first current collector includes a terminal portion protruding from the second electrode layer in a top view viewed from the stacked direction,
the solid electrolyte layer is exposed in a region of the terminal portion in the top view,
the solid electrolyte layer covers a part of a side surface of the first mixture layer in cross-sectional view and is in contact with the terminal portion of the first current collector,
the electrode is in contact with the solid electrolyte layer in an inside of the region of the terminal portion in top view,
the second electrode layer includes a rectangular region having a rectangular shape in the top view, and
the terminal portion protrudes from only a part of a side of the rectangular region in the top view along a first direction.

8. The battery according to claim 7, wherein
a width of the terminal portion in a second direction perpendicular to the first direction is smaller than or equal to a half a width of the first current collector in the second direction.

* * * * *